United States Patent
Chou et al.

(10) Patent No.: US 8,417,885 B2
(45) Date of Patent: Apr. 9, 2013

(54) METHOD AND APPARATUS FOR HIGH AVAILABILITY (HA) PROTECTION OF A RUNNING VIRTUAL MACHINE (VM)

(75) Inventors: Wu Chou, Basking Ridge, NJ (US); Weiping Guo, Piscataway, NJ (US); Vivekananda Velamala, Thornton, CO (US); Zhi Qiang Zhao, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 451 days.

(21) Appl. No.: 12/711,968

(22) Filed: Feb. 24, 2010

(65) Prior Publication Data
US 2011/0208908 A1 Aug. 25, 2011

(51) Int. Cl.
*G06F 12/00* (2006.01)
(52) U.S. Cl. .................................................. 711/112
(58) Field of Classification Search .................. None
See application file for complete search history.

(56) References Cited

U.S. PATENT DOCUMENTS 7,246,256 B2   7/2007   De La Cruz et al.
7,461,230 B1 * 12/2008   Gupta et al. .................. 711/170

OTHER PUBLICATIONS

Remus: High Availability via Asyncrhonous Virtual Machine replication, Brendan Cully et al, 5th Usenix Symposium on Networked SYstems Design and Implementation, NSDI 2008.*
Rapid Resynchronization for Replicated Storage Activity-loggin for DRBD, Philipp Reisner, Jan. 27, 2004.*
Cully et al. "Remus: High Availability via Asynchronous Virtual Machine Replication"; Abstract and Article; 5th USENIX Symposium on Networked Systems Design and Implementation (NSDI '08); Jun. 2008; pp. 1-14; (Abstract) http://www.usenix.org/events/nsdi/tech/cully.html and (Article) http://www.usenix.org/events/nsdi/tech/full_papers/cully/cully.pdf.

* cited by examiner

*Primary Examiner* — Duc Doan
(74) *Attorney, Agent, or Firm* — Sheridan Ross P.C.

(57) ABSTRACT

High availability (HA) protection is provided for an executing virtual machine. A standby server provides a disk buffer that stores disk writes associated with a virtual machine executing on an active server. At a checkpoint in the HA process, the active server suspends the virtual machine; the standby server creates a checkpoint barrier at the last disk write received in the disk buffer; and the active server copies dirty memory pages to a buffer. After the completion of these steps, the active server resumes execution of the virtual machine; the buffered dirty memory pages are sent to and stored by the standby server. Then, the standby server flushes the disk writes up to the checkpoint barrier into disk storage and writes newly received disk writes into the disk buffer after the checkpoint barrier.

16 Claims, 11 Drawing Sheets

METHOD AND APPARATUS FOR HIGH AVAILABILITY (HA) PROTECTION OF A RUNNING VIRTUAL MACHINE (VM)

BACKGROUND

Many computing systems are migrating to a "cloud computing" environment. Cloud computing is the use of a virtualized resource (referred to herein as a "virtual machine") as a service over a network. The virtual machine can execute over a general technology infrastructure in the cloud. In other words, the virtual machine can operate on many different types of hardware computing systems or over several computing systems. The hardware computing systems are generally commodity type systems that are both inexpensive and easy to operate. Cloud computing often provides common business applications online that are accessed over the network, while the software and data are stored on servers. Cloud computing generally precludes the need to use specially designed hardware.

Unfortunately, the commodity type hardware can be prone to faults or breakdowns. As a result, the virtual machine may also be prone to faults from losing the underlying hardware platform. Some virtual machines execute applications that are required to be highly available. In other words, the applications cannot be prone to frequent faults. There have been attempts to create systems or processes to make virtual machines highly available. However, these prior approaches generally suffer from problems.

Prior approaches suffer from two major problems. First, to make the protected virtual machine and the associated standby virtual machine in sync, the high availability protection has to apply at the time when the virtual machine starts. For one reason, once the virtual machine is running, the memory image associated with the virtual machine in the active host server memory and disk will keep changing constantly. To have high availability protection, the protected virtual machine and the associated standby virtual machine must be in perfect sync (i.e., there cannot be changes while replicating information). Second, to capture the running state of the virtual machine (e.g. using live migration), the virtual machine needs to suspend the running for an indefinite amount of time ranging from 10 ms to 10 seconds or even several minutes depending on the state of virtual machine. This suspension can be a major problem for communication services because, with a long suspension, live communication connections, e.g. transmission communication protocol (TCP), will be lost due to timeouts. The loss of communication connections then can result in service disruptions that defeat the purpose of high availability protection.

SUMMARY

It is with respect to the above issues and other problems that the embodiments presented herein were contemplated. The system includes an active host server and a standby host server that can execute a virtual machine. During operation of the virtual machine on the active host server, disk writes associated with the virtual machine are synchronously sent to the standby host server. However, rather than store the disk writes directly to the physical disk, the standby host server stores the disk writes in a disk buffer.

To ensure the proper fail over of the executing virtual machine, the active host server suspends the operation of the virtual machine and sends a signal to the standby host server upon reaching a checkpoint. The checkpoints occur periodically after the initialization of HA. Upon receiving the checkpoint signal, the standby host server creates a checkpoint barrier marker at the last disk write received. With the virtual machine suspended, the standby host server is assured that no further disk writes would be received after receiving the checkpoint signal. At the active host server, the dirty pages in the memory image associated with the virtual machine are copied to a buffer in memory of the active host server. The copying to a buffer is faster than copying directly to the standby host server over a network.

After creating the checkpoint barrier marker, the standby host sends a checkpoint okay signal to the active host server. After copying all the dirty memory pages to the buffer and in response to receiving the checkpoint okay message, the active host server resumes execution of the virtual machine. The buffered dirty memory pages are then sent to the standby host server, which stores the dirty memory pages into memory of the standby host server. Further, the standby host server flushes the disk writes up to the checkpoint barrier marker into disk storage of the standby host server. In this way, the memory image and the disk image are synced at the moment of time associated with the checkpoint barrier. If the standby host server receives any disk writes from the now operating virtual machine, those disk writes are stored in the buffer after the checkpoint barrier marker. Thus, this system and method provides both minimal downtime for an executing virtual machine and ensures a synced memory image and disk image at the standby host server.

For HA purposes, the synchronization between memory replication and disk replication must be perfect; otherwise the incongruity will lead to a system error. If the synchronization is controlled by the active host server, the latency of inter-process communication between the active host server and the standby host server has to be factored in as well. One key idea of the embodiments is to control the memory and disk replication by the standby host server instead of the active host server. To achieve this change, a special disk buffer and a special barrier marker at the standby host server are introduced. When the protected VM is suspended for a checkpoint, a special signal is sent from the active host server to standby host server. The signal instructs the standby host server to set a barrier on the special disk buffer.

There is plenty of time for standby host server to act on the signal because the active host server needs to suspend the protected VM until the active host server copies the incremental memory image (dirty pages) to a local data buffer and then after that, the active host server needs to transmit the data to the standby host server over a data link. Once the active host server completes the dirty page copying to active host server's local buffer, and the active host server receives the acknowledgement that the barrier marker is set by the standby host server, the protected VM will resume running and all new disk writes will be synchronized to write beyond the barrier marker of the disk buffer at the standby host server.

After the memory image dirty pages are transmitted to the standby host server, the standby host server can flush the received memory image and flush the incremental disk image data, in the disk buffer, up to the barrier marker to the standby host server's local disk. This novel process keeps the memory replication and disk replication perfectly aligned at each checkpoint time instance because the active host server and the standby host server replicate the exact protected VM state (memory and disk) when the protected VM is suspended at the checkpoint.

The novel process can include the following steps to apply HA protection dynamically on a running VM without service disruption. The first step may be initial disk synchronization. The disk image can be synchronized before applying HA protection. If the disk is not synchronized, the HA protection will fail as the disk and memory on the standby host server will be out of sync. A synchronous disk synchronization scheme, e.g. DRBD, may be used to synchronize the disk during the initiation. The protected VM checks the disk status. If disk is not synchronized, the standby host server starts the synchronization and waits for the synchronization to finish, while the protected VM continues running normally. The DRBD synchronization runs in the background until DRBD catches up the writes of the protected VM disk image. Once DRBD finishes the disk sync and catches up with the protected VM disk writes, the disk status on both active host server and standby host server is 'up to date'.

HA protection can then be started. The first step of HA protection is to copy the whole protected VM memory image to the standby host server. This replication can be achieved by live migration, while the protected VM is running and the disk image at the standby host server is kept in sync using DRBD. On the last iteration of the live migration, the VM is suspended and the dirtied pages are sent to the standby host server. The standby host server will issue a request to the local DRBD process to enable disk buffering and send 'CKPT-OK' back to the active host server indicating the standby host server is ready to apply HA protection. Once the active host server receives 'CKPT-OK' response from the standby host server, the active host server resumes the protected VM and waits for the designated checkpoint interval to expire.

After HA initialization, the protected VM executes normally. The protected VM writes data to the local disk. The DRBD on the active host server simultaneously sends every disk block write to the disk storage and to the standby host server in synchronous writes. The DRBD on the standby host server does not apply the disk writes to the physical disk directly; instead, the standby host server stores them in a memory buffer.

At some point in time, an HA checkpoint is reached. At the checkpoint, the active host server suspends the protected VM and sends a "CKPT" request to the standby host server notifying the standby host server that a checkpoint is impending. Substantially in parallel with sending the "CKPT" signal, the active host server copies the dirtied memory pages to a local buffer. When the standby host server receives the "CKPT" request, the standby host server issues a "CKPT-BARRIER" to the DRBD. At this time, the protected VM at the active host server is suspended. Therefore, no disk write is expected by standby host server. The DRBD process at the standby host server marks the last disk write before the VM was suspended in the local buffer as the barrier for the checkpoint. The standby host server sends a "CKPT-OK" response back to the active host server. Upon receiving the "CKPT-OK" response from the standby host server and the completion of copying dirty pages to the local buffer at the active host server, the protected VM at the active host server resumes running, while the active host server sends the dirtied pages to the standby host server. Once all the dirtied pages are received at the standby host server, the standby host server issues a disk commit request to its local DRBD. The DRBD will apply all the disk writes on the local buffer up to the CKPT-BARRIER. This process ensures that the replication of the memory and disk, between the protected VM at the standby host server, are in perfect sync at the checkpoint. The process iterates continuously from one checkpoint to another based on the desired time interval (e.g. every 20 to 40 milliseconds).

Embodiments of systems and methods provided herein describe a solution for providing high availability (HA) protection that addresses the above problems with interrupting or stopping the normal operations of a running virtual machine (VM). The embodiments herein depart from previous solutions in that the embodiments do not need to stop and restart the VM to apply HA protection and also HA protection is based on commodity hardware (no special hardware as in other approaches). In addition, the embodiments require no modification of existing software applications. The embodiments described herein have the potential to achieve high availability for VMs beyond five or six nine's.

These and other advantages will be apparent from the disclosure of the invention(s) contained herein.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "daemon" is a computer program that runs in the background, rather than under the direct control of a user; which are usually initiated as background processes.

The term "filesystem" is a method for storing and organizing computer files and the data they contain to make it easy to find and access them. File systems may use a computer readable medium and involve maintaining the physical location of the files.

The term "module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that aspects of the invention can be separately claimed.

The term "page" refers to a section of memory that is accessible at one time.

The term "virtual machine" includes system virtual machines (or hardware virtual machines), which provide a complete system platform to support the execution of a complete operating system, and process virtual machines (or process virtual machines), which run a single program that supports a single process. System virtual machines allow the sharing of the underlying physical machine resources between differing virtual machines, each running on its own operating system. Process virtual machines run as a normal application inside on operating system, are created when the supported process is started, and destroyed when the process exists. A common characteristic of a virtual machine is that the software running inside is limited to the resources and abstractions provided by the virtual machine.

Hereinafter, "in communication" shall mean any electrical connection, whether wireless or wired, that allows two or more systems, components, modules, devices, etc. to exchange data, signals, or other information using any protocol or format.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. Various changes may be made in the function and arrangement of elements without departing from the spirit and scope of the invention as set forth in the appended claims.

Figure 1A:
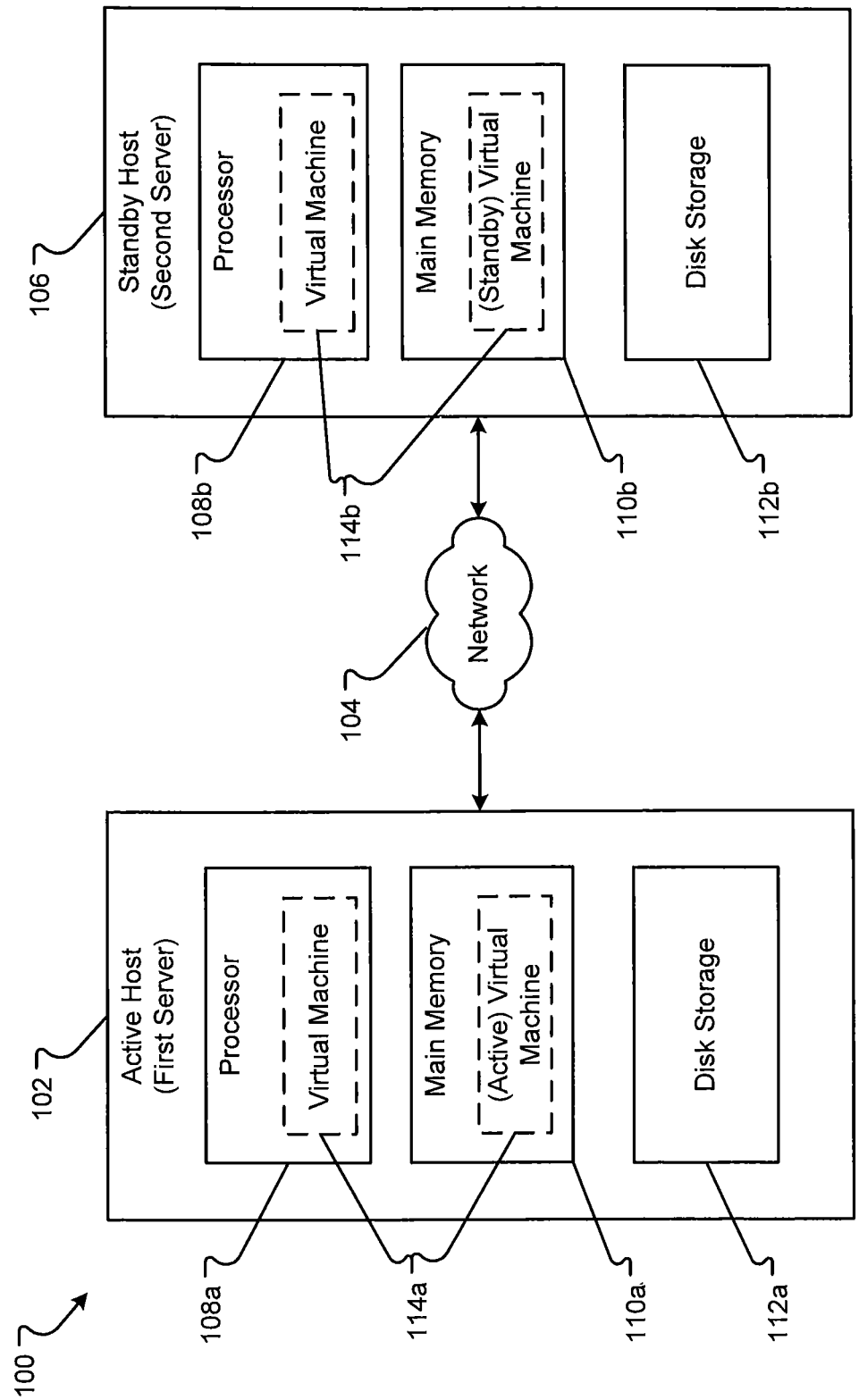
FIGS. 1A and 1B are block diagrams of an embodiment of a system for providing HA protection to a VM.
Figure 1B:
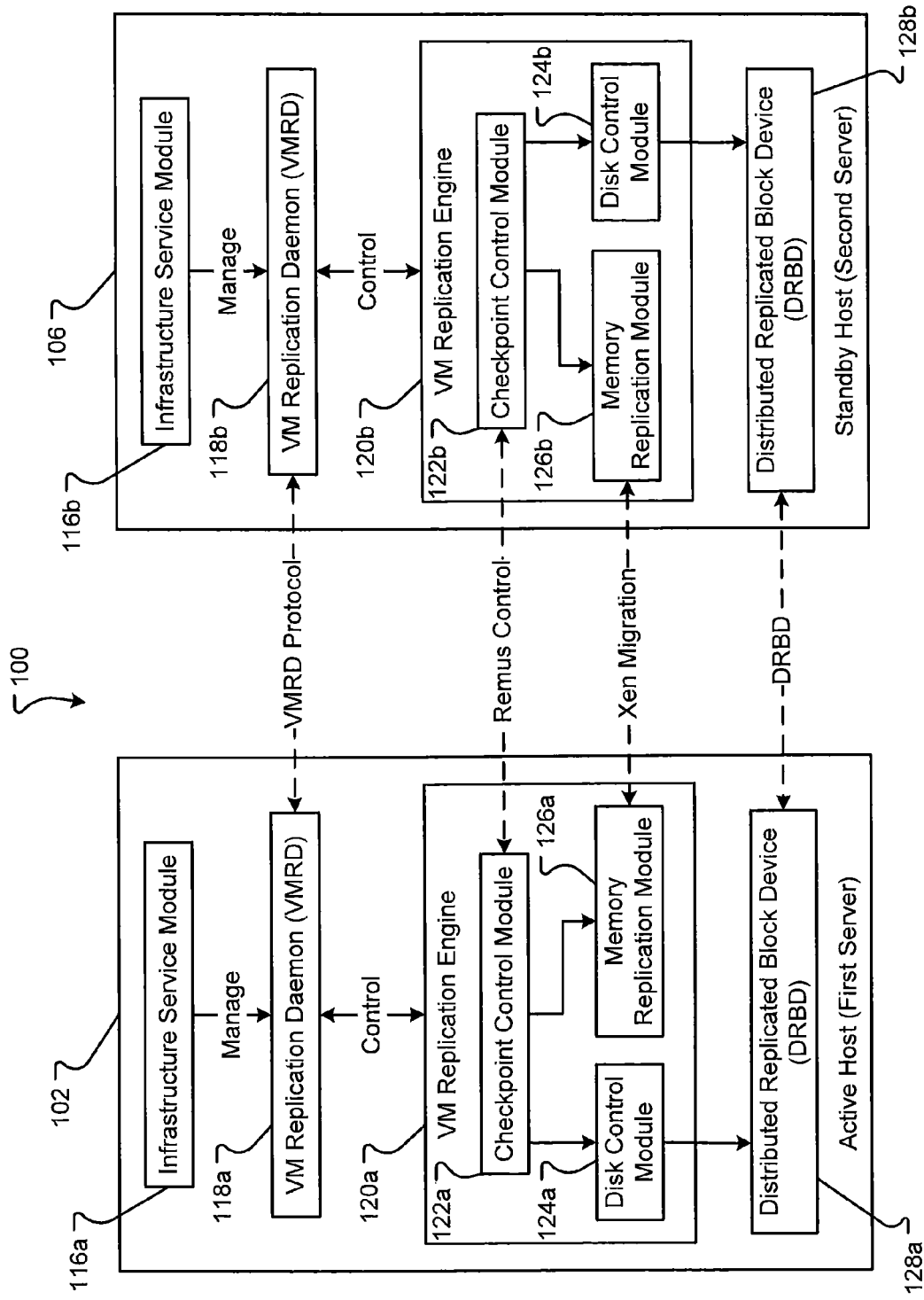

An embodiment of an environment generally operable to execute the system 100 is shown in FIGS. 1A and 1B. The system 100 generally includes an active host (first server) 102 and a standby host (second server) 106. The active host 102 and the standby host 106 can include computers or computing systems, such as a server, and can be referred to simply as "servers." The active host 102 and the standby host 106 are generally computing systems as described in conjunction with FIGS. 6 and 7. In embodiments, the active host 102 and the standby host 106 are separate hardware devices. In some embodiments, it may be possible to include the active host 102 and the standby host 106 on a single hardware device, having two or more processors. However, the active host 102 and the standby host 106 will hereinafter be described as being separate computing systems.

The active host 102 and the standby host 106 can be in communication through a network 104. The network 104 may be as described in conjunction with FIGS. 6 and 7. The network 104 may not be shown in subsequent drawings but is still provided to allow communication between the active host 102 and the standby host 106.

The active host 102 and the standby host 106 include a processor 108a and/or 108b, such as a microprocessor, to execute a virtual machine (VM) 114a and/or 114b, a main memory 110a and/or 110b, and disk storage 112a and/or 112b. Main memory 110 and disk storage 112 can be any suitable form of computer readable media. Typically, disk storage 112 is one or more of a floppy disk, a flexible disk, a hard disk, a magnetic tape, or any other magnetic medium, a magneto-optical medium, a CD-ROM, any other optical medium, punch cards, paper tape, and any other physical medium with patterns of holes. In one configuration, the processor 108 and main memory 110 are collocated, while the disk storage 112 is located remotely wherefrom. Main memory 110 can also store one or more of data, executable code, states, or other information for the one or more VMs 114. Disk storage 112 can store disk writes for the one or more VMs 114. The disk writes can include one or more items of data or other information that is to be stored.

In embodiments, the active host 102 executes one or more VMs 114. A virtual machine 107 is a software implementation of a "machine" (e.g., a computing system) that executes applications or programs like a physical computing system or machine. The memory image and disk writes (which can correspond to a memory session and a "filesystem" associated with a virtual machine) for the virtual machine 107a are synchronized, mirrored, or replicated to the standby host 106 for the "back-up" or "standby" virtual machine 107b, which is not executing while virtual machine 107a is executing on the active host 102. In the event that the active host 102 fails or is no longer able to execute the virtual machine 107a, the active VM 114a "fails over" to the standby host 106, which can assume the execution of the standby VM 114b. As such, the combination of the active host 102 and standby host 106 provide high availability for the VM 114.

Another embodiment of the system 100, showing components or modules executed by the active host 102 and the standby host 106, is shown in FIG. 1B. The components or modules shown in FIG. 1B may be software modules or processes executed by a processor 108 and stored in main memory 110 of the active host 102 and the standby host 106, may be logic circuits incorporated into the hardware of the active host 102 and the standby host 106, or some combination thereof. In embodiments, the components or modules shown in FIG. 1B help maintain the high availability of the virtual machine 107. The components or modules include one or more of, but are not limited to, an infrastructure service module 116a and 116b, a virtual machine replication daemon (VMRD) 118a and 118b, a virtual machine replication engine (VMRE) 120a and 120b (which can include a checkpoint control module 122a and 122b, a disk control module 124a and 124b, and a memory replication module 126a and 126b), and a distributed replicated block device (DRBD) 128a and 128b.

The infrastructure service module 116 is a daemon that can provide communication or membership services to a client. The infrastructure service module 116 allows clients to know about the presence of a process on another machine. For example, the infrastructure service module 116 on the standby host 106 would want to know about the presence of the active VM 114a on the active host 102. If the active VM 114a is not present, the standby host 106 would know to execute the standby VM 114b. An example of an infrastructure service module 116 is Heartbeat offered as open source software for Linux. The VMRD 118 and the VMs 114 may be members to which the infrastructure service module 116 determines presence or provides presence status. The infrastructure service module 116 can send a "manage" signal to the VMRD 118, which can cause the VMRD 118 to create a standby VM 114b or synchronize or update the standby VM 114b.

The VMRD 118 is a daemon process to manage the VMRE 120. To accomplish the replication, the VMRD 118 can send "control" signals to the VMRE 120, such as start/stop VMRE 120, promote/demote VMRE 120, which, in turn, activates/destroys the VM 114. Further, the VMRD 118a on the active host 102 can communicate to the VMRD 118b on the standby host 106 using a VMRD protocol. The communications, between the VMRD 118a and the VMRD 118b, help coordinate the replication of data from the active host 102 to the standby host 106 and coordinate a graceful switchover. The VMRD 118 has two different roles: "active" or "standby" depending on whether the VMRD 118 is running on the active host 102 or the standby host 106. The active VMRD 118a is capable of detecting the existence of the standby VMRD 118b. Once the communications between VMRD 118a and VMRD 118b is established, VMRD 118a can start VM protection by starting the VMRE 120a.

A VMRE 120 manages the replication of the active VM 114a to the standby VM 114b. The VMRE 120 can manage the initial replication and subsequent, periodic updates of the active VM 114a to the standby host 106. It should be noted that the active VM 114a can be a running VM. As such, the VMRE 120a can manage replication after the active VM 114a is running and without stopping the execution of the active VM 114a. The VMRE 120 may include a checkpoint control module 122, a disk control module 124, and a memory replication module 126. The checkpoint control module 122 controls the replication of the main memory 110 and the disk storage 112. Both the main memory 110 and disk storage 112 must be replicate in a manner that allows the standby host 106 to execute the VM 114. There are several processes or methods for controlling the replication.

In one technique implemented by a software system Remus™, periodic "snapshots" of the filesystem, network (session), and VM output cache in main memory 110 states of a selected active VM 114a are replicated at relatively high frequencies (e.g., every 20 to 40 milliseconds). In another technique implemented by a software system sold by Paragon Software Group™, under the tradename Snapshot™, a file system writes selected first data blocks to a computer readable medium, marking them with pointers. A snapshot is taken (e.g., of the filesystem, network, and VM output cache states of the active first, second, . . . nth virtual machines 152a-n), without any data being read, written or copied to the computer readable medium. The snapshot simply points to the current locations. As will be appreciated, other mirroring techniques may be used, such as the techniques used by Double-Take™, from Double-Take™ Software.

The checkpoint control module 122 can control the actions of the memory replication module 126 and the disk control module 124. The checkpoint control module 122 can communicate through a defined CKPT control protocol to achieve synchronized memory and disk replication. As such, the checkpoint control module 122 ensures that the replication of information from the disk storage 112 and the main memory 110 is in sync. How the checkpoint control module 122 controls the replication process is explained in conjunction with FIGS. 3-5B.

A memory replication module 126 can replicate the data in main memory 110a to the standby host 106. In embodiments, the memory replication module 126 stores data from the main memory 110a associated with the active VM 114a to a buffer. From the buffer, the data is sent to the main memory 110b of the standby VM 114b. The memory replication module 126 may use a migration process available with XenServer, available through Citrix Systems.

Similar to the memory replication module 126, the disk control module 124 helps replicate data from one or more disks on the active host 102 to the standby host 106. The disk control module 124 may control a DRBD 128. DRBD 128 is a distributed storage system that may be similar to RAID 1, except that DRBD 128 runs over the network 104. DRBD 128 refers to both the software and also to logical block devices (e.g., the disk storage 112) managed by the software. DRBD 128 copies disk writes from the disk storage 112a to disk storage 112b.

Figure 2A:
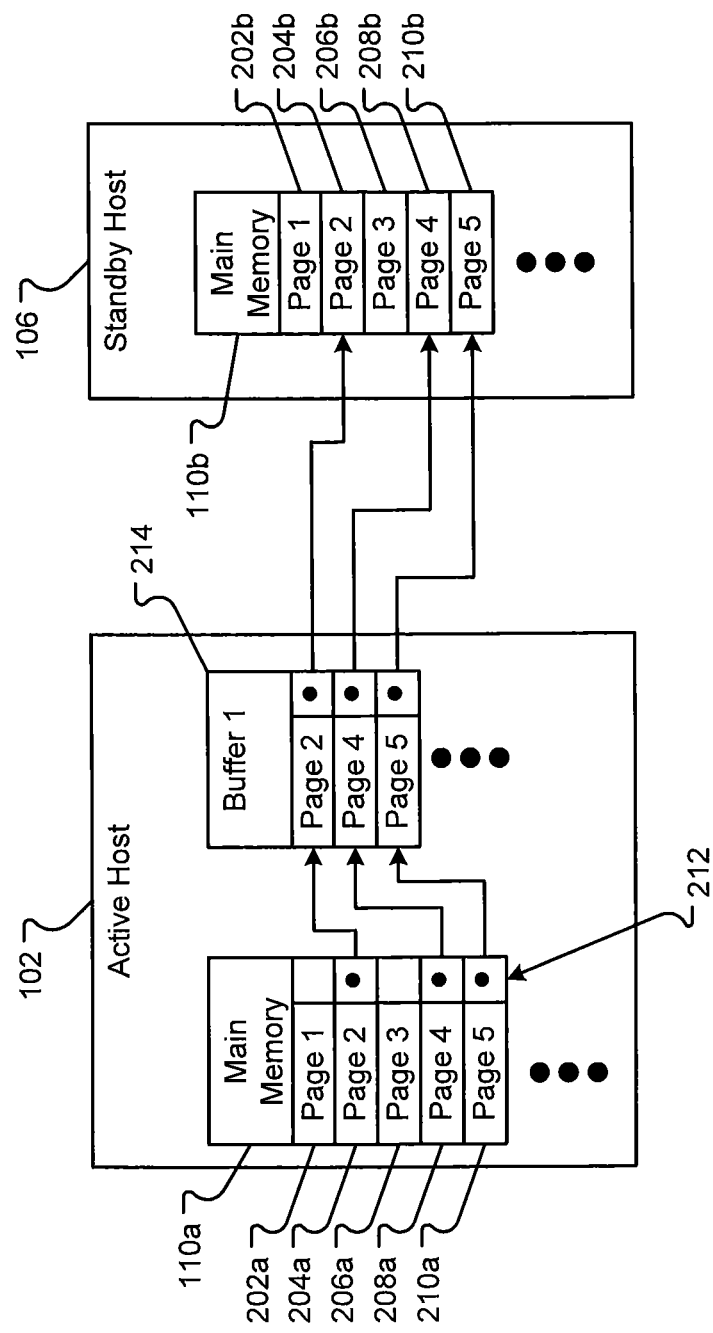
FIGS. 2A and 2B are block diagrams of embodiments of data structures that may be stored, sent, or received by one or more computer systems and represent buffers used to mirror data for an HA protected VM.

Embodiments of data structures used to copy a memory image or data, associated with an active VM 114a, from main memory 110a in the active host 102 to the main memory 110b in the standby host 106 are shown in FIG. 2A. Here, the main memory 110a and the main memory 110b include one or more pages of memory 202a through 210a and 202b through 210b, respectively. During initialization of high availability, the entire memory image for the active VM 114a will be migrated to the main memory 110b of the standby host 106. This process is explained in conjunction with FIGS. 3-5B. However, after initialization of high availability, the active host 102 may mark particular memory pages (e.g., pages 204a, 208a, and/or 210a) dirty with a marker 212. The marker 212 may be any data element that can mark a memory page as having been changed from some moment in time. The dirty memory pages can be copied to a separate buffer 1 214. From the buffer 1 214, the active host 102 may send the dirty memory pages to the standby host 106 to store in the main memory 110b of the standby host 106.

Figure 2B:
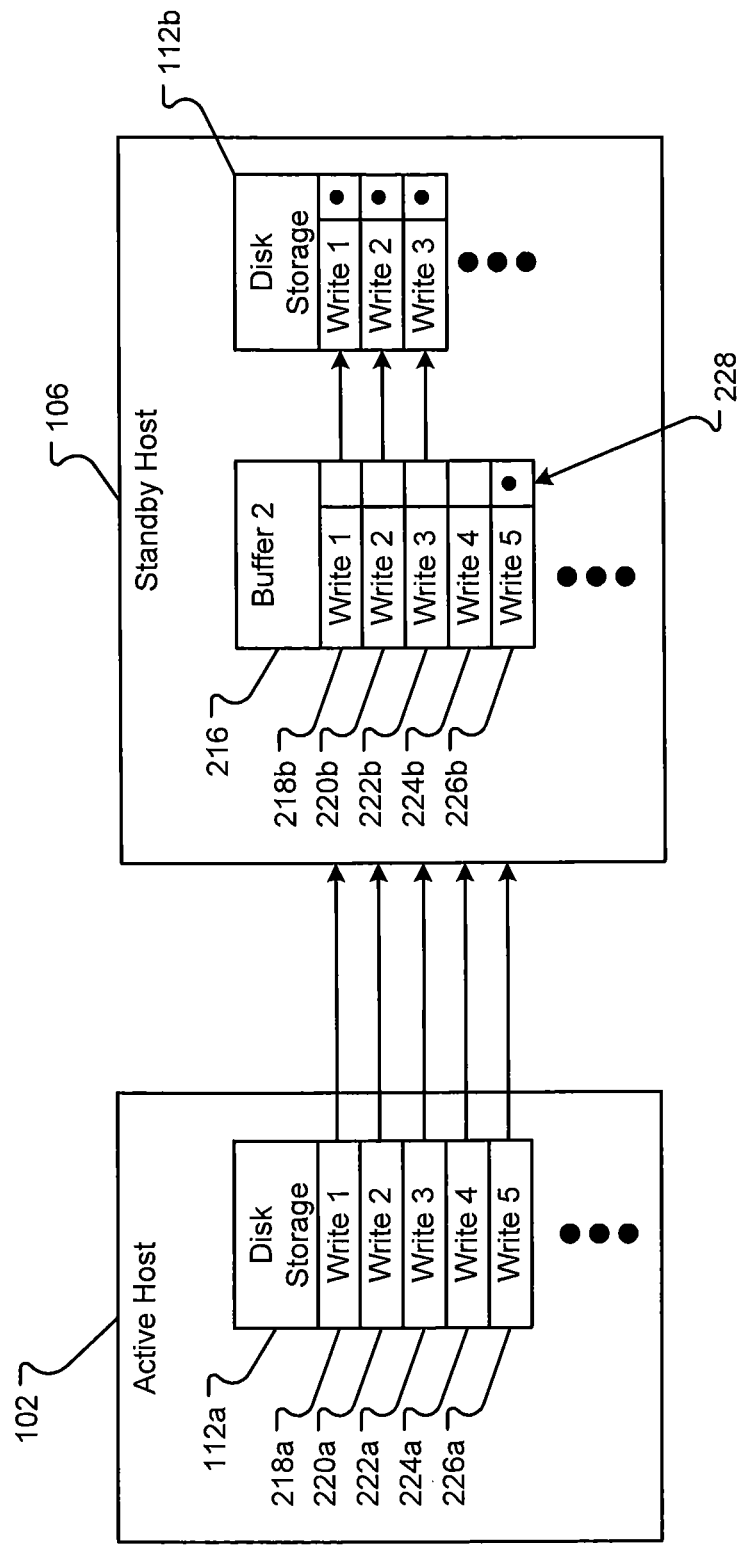

Embodiments of data structures used to copy a disk image or data from disk storage 112a in the active host 102 to the disk storage 112b in the standby host 106 are shown in FIG. 2B. Here, the disk storage 112a includes one or more writes to a disk 218a through 226a, which correspond to writes 218b through 226b in buffer 2 216. Before initialization of high availability, the entire disk image for the active VM 114a will be synchronized to the disk storage 112b of the standby host 106. This process is explained in conjunction with FIGS. 3-5B. However, after initialization of high availability, the standby host 106 receives disk writes from the active host 102 as the disk writes are occurring at the disk storage 112a. The received disk writes 218b through 226b are stored in a buffer 2 216. At some point, the standby host 106 may mark particular disk write (the last disk write before the VM is suspended) 226b with a checkpoint barrier marker 228 (shown in FIG. 2B with "Write 3" 222b), which designates a checkpoint barrier. The checkpoint barrier marker 228 may be any data element that can create checkpoint barrier for some moment in time. The standby host 106 can flush the disk writes (e.g., 218b, 220b, and/or 222b) from the buffer 2 216 to disk storage 112b and the buffer 2 216 flushed as explained in conjunction with FIGS. 3-5B.

Figure 3:
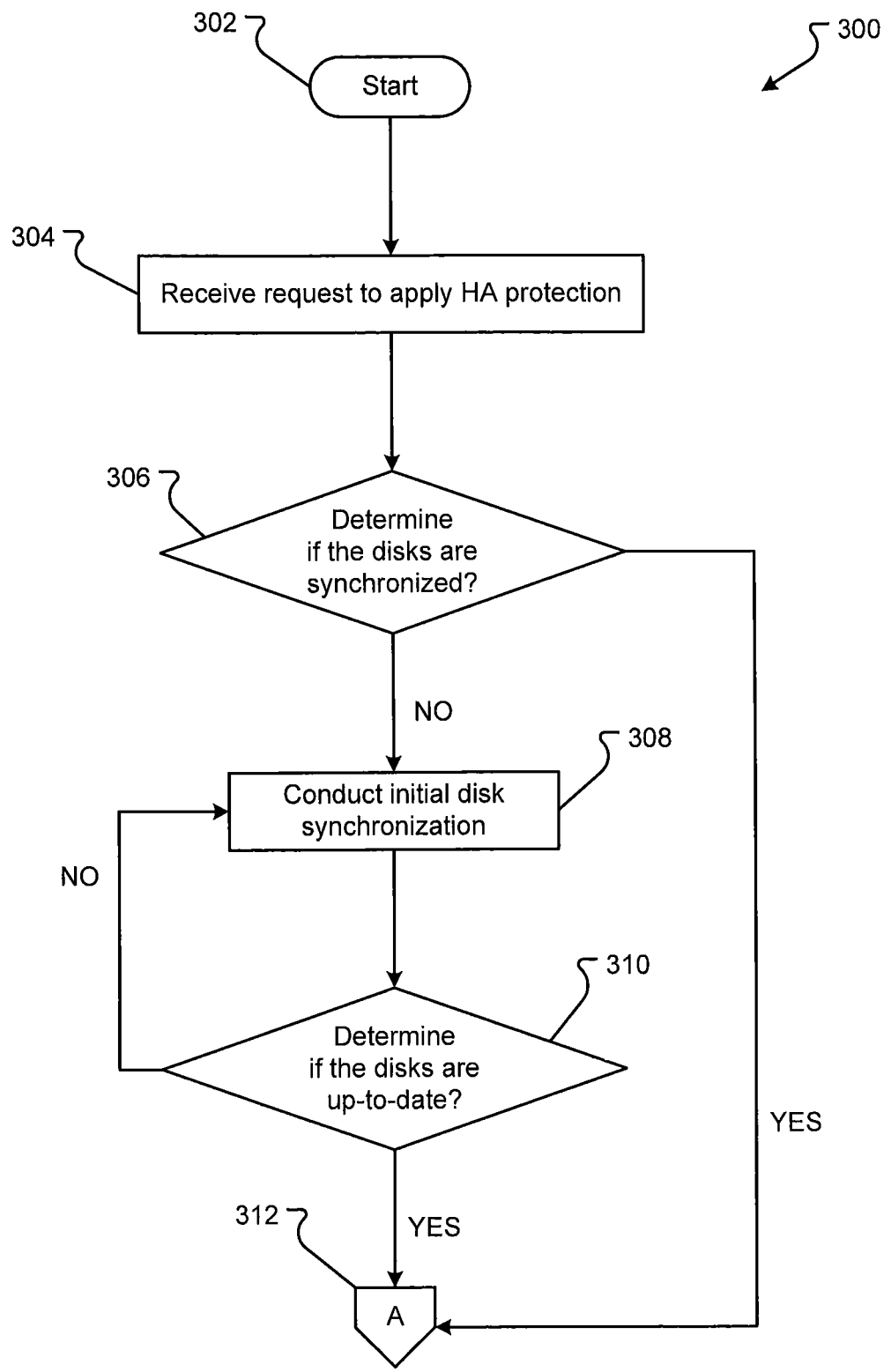
FIG. 3 is a flow diagram of an embodiment of a process for synchronizing disk storage between servers before initializing HA protection for a VM.

A method 300 for providing high availability to a running VM 114 executing on community hardware is shown in FIG. 3. Generally, the method 300 begins with a start operation 302 and terminates with an operation 312. The method 300 can represent the process executed when first creating a standby VM 114b on the standby host 106. While a general order for the steps of the method 300 are shown in FIG. 3, the method 300 can include more or fewer steps or arrange the order of the steps differently than those shown in FIG. 3. The method 300 can be executed as a set of computer-executable instructions executed by a computer system and encoded or stored on a computer readable medium. Hereinafter, the method 300 shall be explained with reference to the systems, components, modules, software, data structures, etc. described in conjunction with FIGS. 1-2B.

The provision of HA protection is for running VMs. As such, HA protection is provided without the active host stopping the execution of one or more applications and with maintaining one or more connections of the active host. In other embodiments, HA protection is provided without the active host stopping the execution of any applications and with maintaining all connections of the active host. The applications can be any software application executing on the active host, either in association with the VM or not. For example, the application may be a Private Branch Exchange (PBX) executing in the VM environment. The connections can be any hardware or software "connection" through which the active host sends or receives data, signals, information, or other communications. The connections may be between two software modules, two hardware modules, or a software module and a hardware module. For example, a Session Initiation Protocol (SIP) phone may be "connected" with a PBX executing with a VM. The HA protection can be provided to the VM without dropping the connection of the SIP phone with the PBX.

An active host 102 receives a request to apply HA protection to an active VM 114a, in step 304. The request can be automatically generated for all or some VMs 114 specified by the code of the VM 114, the active host 102, or by another process. In other embodiments, a user sends a request for HA protection for the VM 114. It should be noted that the active VM 114a may already be executing on the active host 102.

To begin, the infrastructure service module 116 can send a manage signal to the VMRD 118, which in turn starts the VMRE 120 to begin the process of creating the standby VM 114b. The standby host 106 may create the necessary structures and code for the standby VM 114b, while awaiting the main memory 110 and disk images to be replicated. In response to the manage signal, the VMRD 118 can control the VMRE 120 to begin replicating main memory 110 and disk images associated with the active VM 114a.

The VMRE 120 can first determine if the disks are synchronized between the active host 102 and the standby host 106, in step 306. Here, the VMRDs 118 or the VMREs 120 can compare disk images provided by the DRBD 128. The comparison can include comparing a portion of the disk image or a checksum or other value derived from the disk image. If the disk images are different, the VMRDs 118 or the VMREs 120 determine that the disks are not synchronized. If the disks are not synchronized, the step 306 flows NO to step 308. However, if the disks are synchronized, the step 306 flows YES through connector A 312 to step 402 in FIG. 4.

To complete the initial synchronization of the disks, the VMRE 120 can control the disk control module 124 to send a command to the DRBD 128 to synchronize the disks. The DRBD 128 can then use a synchronization process, such as DRBD or other process, to synchronize the disks, in step 308. To synchronize, the DRBD 128a can write all disk blocks to DRBD 128b to store into disk storage 112b. Further, disk writes are received by the disk storage 112a, the DRBD 128a can substantially simultaneously send the disk writes to DRBD 128b. The disk synchronization process continues until the disk images associated with the active VM 114a is mirrored on disk storage 112b.

The VMRDs 118 or VMRE 120 may then determine if the disks are up-to-date, in step 310. Here, the VMRDs 118 may continue querying the disk status provided by the DRBD 128 until the disk images are in sync. In other embodiments, the DRBD 128a sends a signal announcing when the last write has been sent to the standby host 106. If the signal is received, the VMRDs 118 determine that the disks are up-to-date. If the disks are up-to-date, the step 310 flows YES through connector A 312 to step 402 in FIG. 4. However, if the disks are not up-to-date, the step 310 flows back to step 308.

Figure 4A:
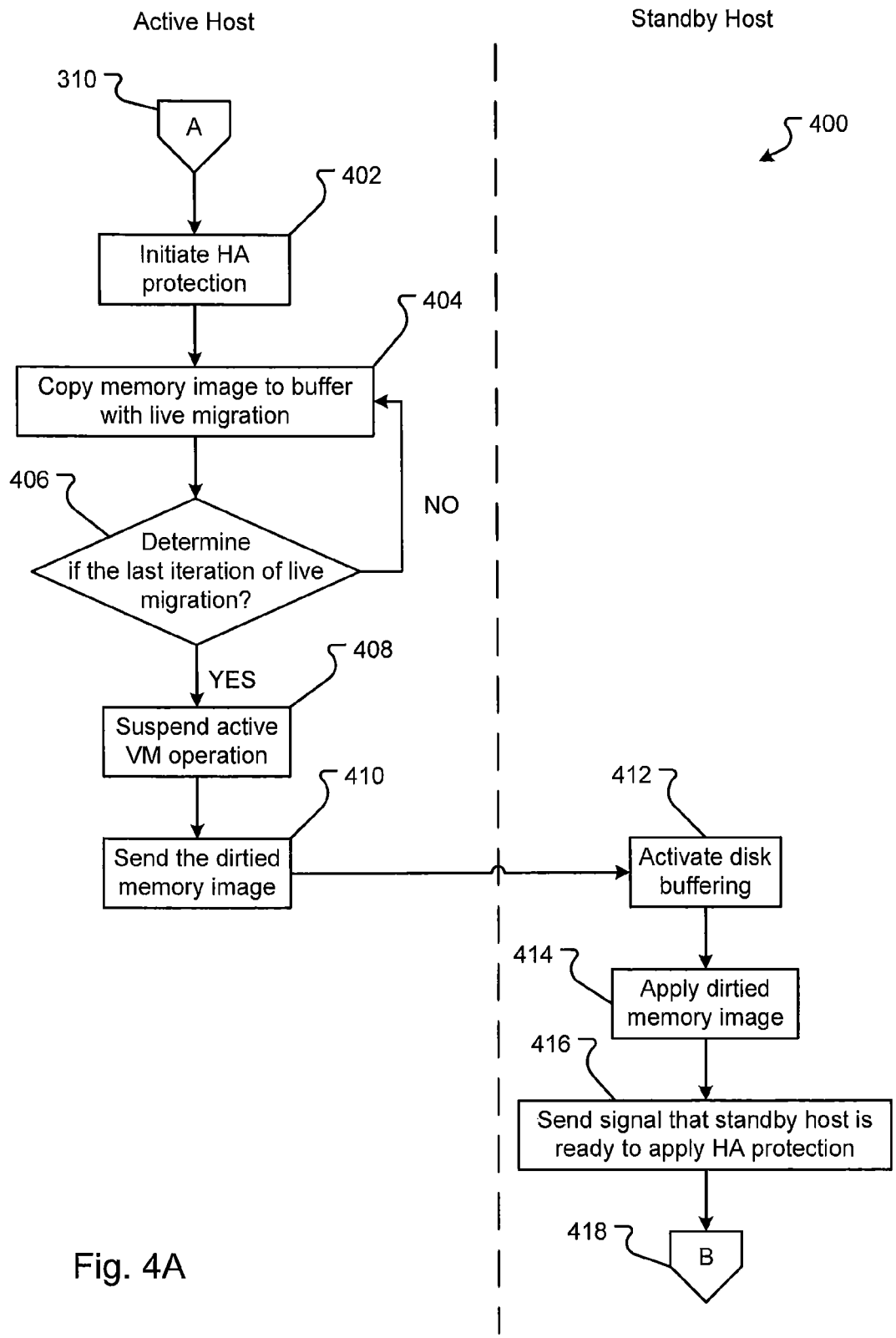
FIGS. 4A and 4B are flow diagrams of an embodiment of a process for initializing HA protection for a VM.
Figure 4B:
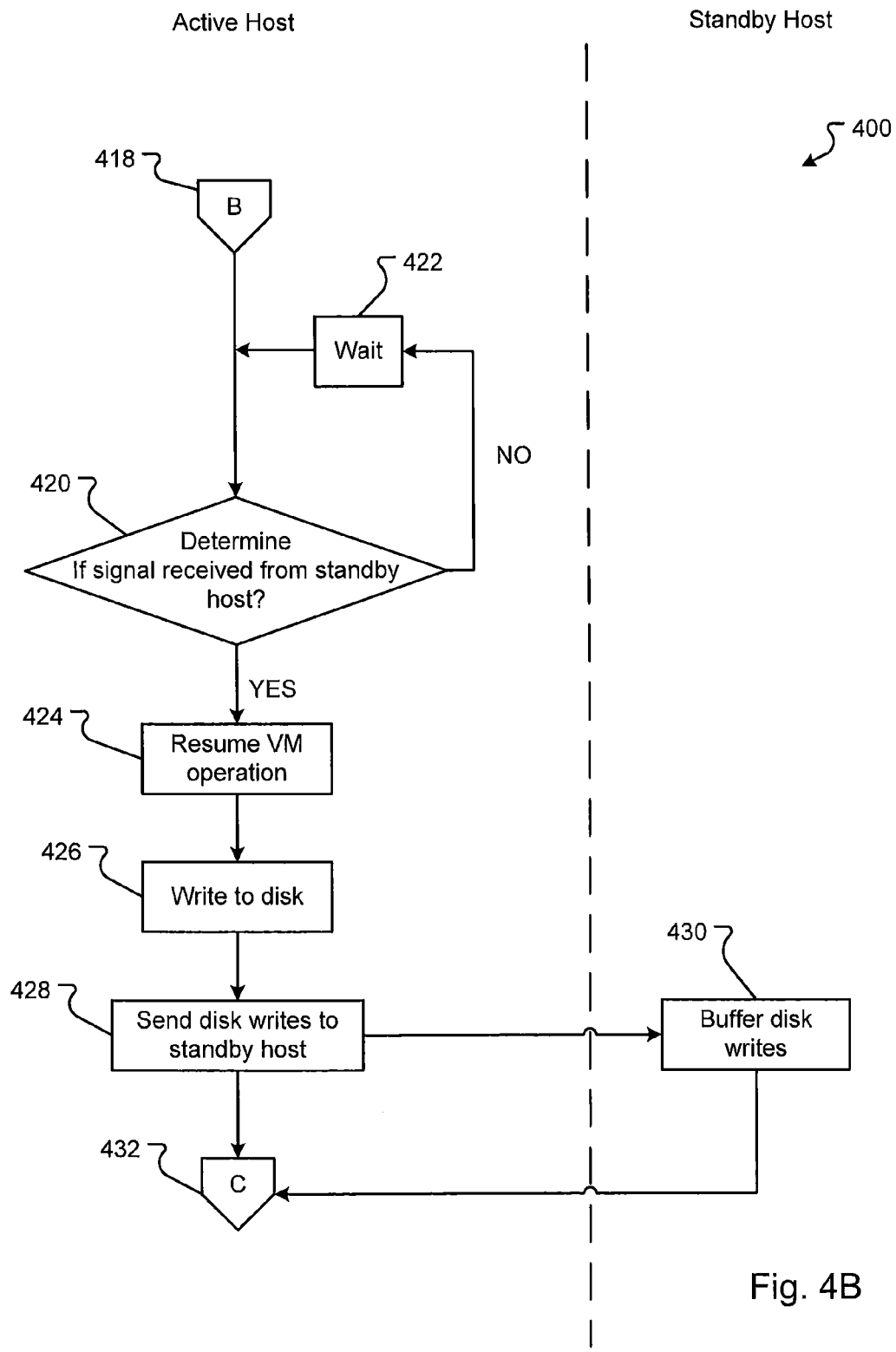

A method 400 for initiating high availability for a VM 114 executing on commodity hardware is shown in FIGS. 4A and 4B. Generally, the method 400 begins with a start operation and terminates with an operation 432. However, this method 400 is a continuation of the method 300 shown in FIG. 3 and a possible precursor to the method 500 shown in FIGS. 5A and 5B. The method 400 can represent the process, after the initial disk synchronization, executed when first initializing HA for the standby VM 114b on the standby host 106. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-2B.

After disk synchronization, the VMRD 118 initiates HA protection for the active VM 114a by instructing the VMRE 120 to begin HA protection, in step 402. The VMRD 118 instructs the VMRE 120 to replicate the memory image to the standby host 106. The VMRE 120 instructs the memory replication module 126 to replicate the memory image. In response to the instruction, the memory replication module 126a copies the memory image to the standby memory replication module 126b using live migration (e.g., Xen live migration), in step 404. During the copying of the memory image, the DRBD 128 continues to synchronizing the disk write between the active host 102 and the standby host 106. The memory replication module 126a then determines if the last iteration of the live migration has occurred, in step 406. The last iteration is the copying of the last part of the memory image to be sent to the standby host 106. If the last iteration of the live migration has occurred, the step 406 flows YES to step 408. If the last iteration of the live migration has not occurred, the step 406 flows NO to return to step 404.

Generally, at the last step of the live migration, the VMRE 120a sends a suspend instruction to suspend the execution of the active VM 114a, in step 408. It should be noted that the active VM 114a is suspended and not stopped. In this way, the states and operating conditions of the active VM 114a are maintained in main memory 110. After suspending the active VM 114a, the VMRE 120a sends the instructs to the memory replication module 126a to send the dirtied memory pages to the memory replication module 126b of the standby host 106, in step 410.

In response to receiving the memory pages, the VMRE 120b instructs the disk control module 124b to begin disk buffering, in step 412. Disk buffering involves the disk control module 124b controlling the DRBD 128b to write disk writes, sent from the DRBD 128a, to the buffer 2 216. The memory replication module 126b then applies the dirtied memory pages to the main memory 110b, in step 414. After step 412 and 414 are complete, the VMRE 120b also sends a checkpoint okay, "DISK-OK," message back to the active host 102, in step 416. The method 400 then flows through connector B 418 to step 420 in FIG. 4B.

The VMRE 120a then determines if the DISK-OK message has been received from the standby host 106, in step 420. If the DISK-OK message has been received, the step 420 flows YES to step 424. However, if the DISK-OK message has not been received, the step 420 flows NO to step 422 to wait for the DISK-OK message. In response to receiving the DISK-OK message, the VMRE 120a instructs the active VM 114a to resume operation again, in step 424. With the method 400 described above, the amount of time the active VM 114a is suspended is very small.

As the active VM 114a continues to operate, the active VM 114a creates further disk writes, in step 426. The DRBD 128a can synchronously send the disk writes (e.g., 218a through 226a) to the DRBD 128b, in step 428. The received disk writes (e.g., 218b through 226b) at the standby host 106 are stored in the buffer 2 216, in step 430, waiting to be committed after the incremental memory dirty pages of the active host 102 arrive to keep the standby host 106 in sync with the active host 102 at the checkpoint.

Figure 5A:
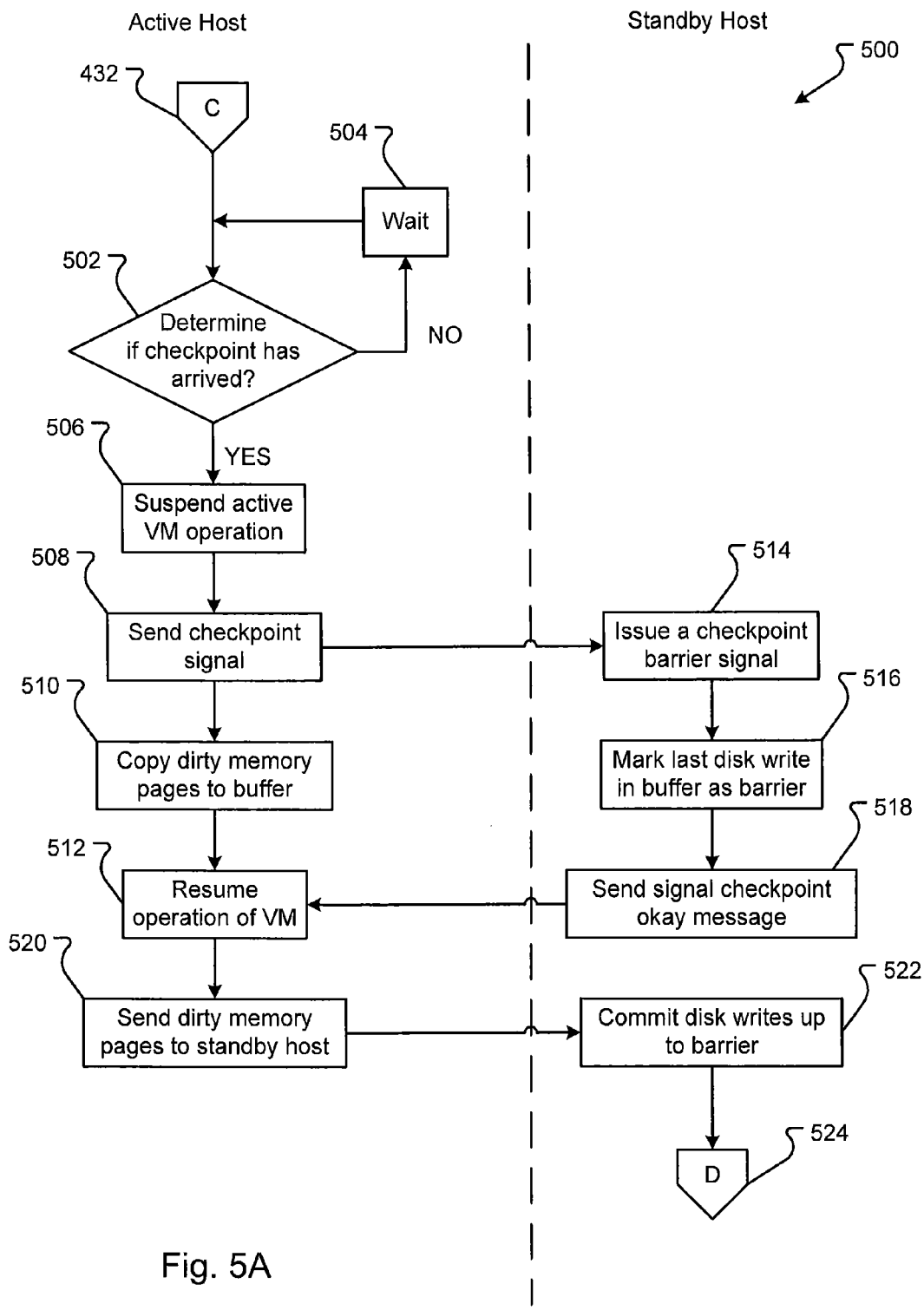
FIGS. 5A and 5B are flow diagrams of an embodiment of a process for executing a checkpoint process for HA protection for a VM.
Figure 5B:
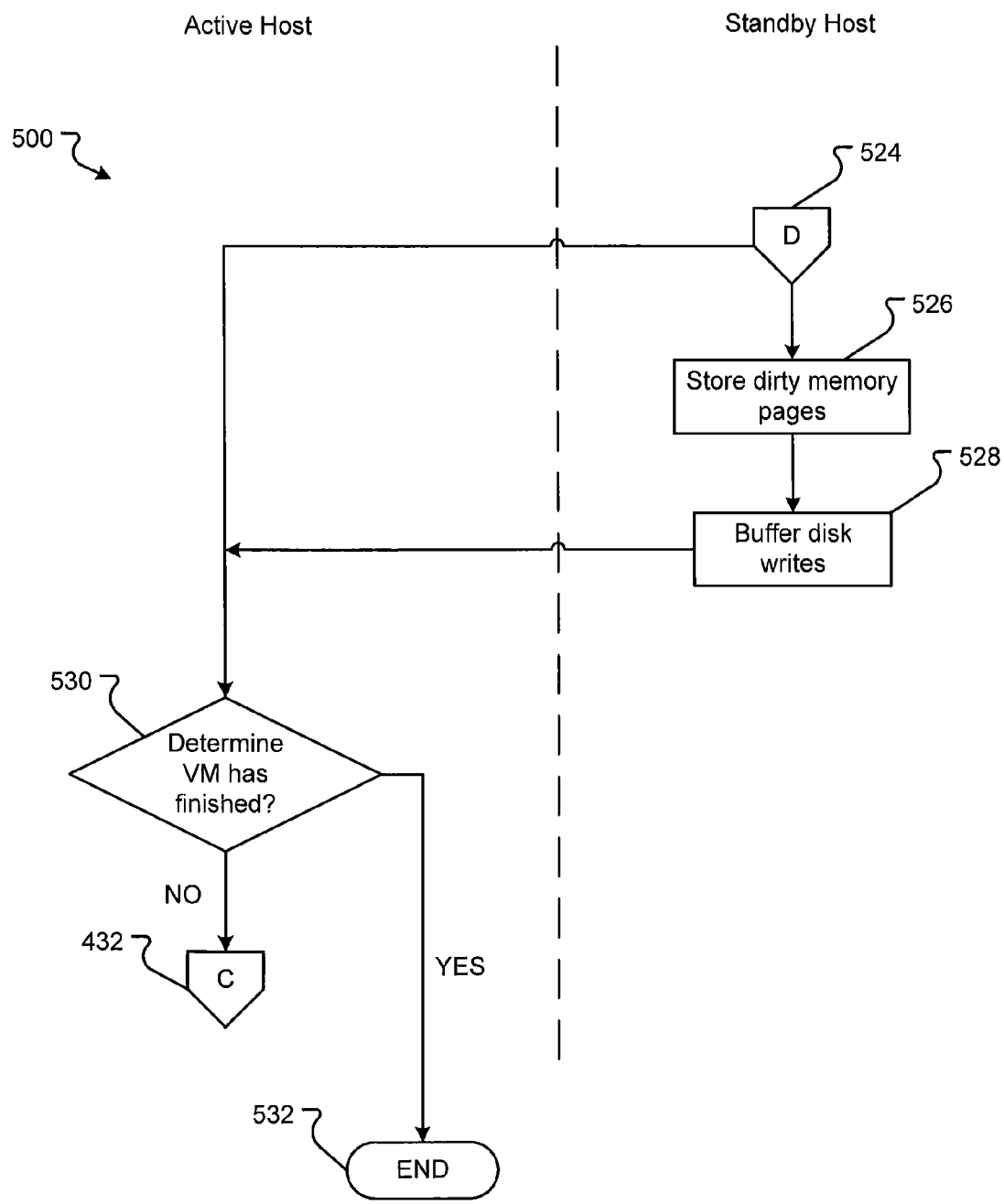

A method 500 for maintaining high availability using a checkpoint process for a VM 114 executing on commodity hardware is shown in FIGS. 5A and 5B. Generally, the method 500 begins with a start operation and terminates with an operation 532. The method 500 can represent the process executed when periodically changing the memory image or disk image during a checkpoint. Generally, a checkpoint is a moment in time that occur periodically (e.g., every 20 to 40 milliseconds). While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-2B.

In embodiments, the infrastructure service module 116a determines if a checkpoint has arrived, in step 502. The infrastructure service module 116a may have a clock that decrements over a predetermined period of time. Upon the clock reaching zero, the checkpoint has arrived. Other clock techniques of other methods for having a recurring and periodic checkpoint occur are known in the art. If a checkpoint has arrived, the step 502 flows YES to step 506. If a checkpoint has not arrived, the step 502 flows NO to wait for the checkpoint, in step 504.

If a checkpoint has arrived, the VMRE 120a sends a signal to the active VM 114a to suspend operation, in step 506. Upon suspension of the active VM 114a, the VMRE 120a sends a checkpoint, "CKPT," message to the VMRE 120b on the standby host 106, in step 508. The CKPT message alerts the standby host 106 that a checkpoint is impending. Either while or soon after the CKPT message is sent, the VMRE 120 directs the memory replication module 126a to store dirtied memory pages (e.g., 204a, 208a, and/or 210a) to the buffer 1 214, in step 510. This replication of the dirtied memory pages is very fast.

At the standby host 106, in response to the CKPT message, the VMRE 120b instructs, with a checkpoint barrier message "CKPT-barrier," the disk control module 124b to create a checkpoint barrier, in step 514. The disk control module 124b directs the DRBD 128b to mark the last disk write (e.g., 222b) in the buffer 2 216 as the checkpoint barrier, in step 516. With the active VM 114a suspended, the standby host 106 is assured that there would be no disk writes after the last disk write received. Then, the VMRE 120b sends the checkpoint okay message, "CKPT-OK," back to the active host 102, in step 518.

In response to receiving the CKPT-OK message and the completion of the storage of dirty memory pages in the buffer 1 214, the VMRE 120 instructs the active VM 114a to resume operation, in step 512. With the copying of the memory pages occurring while the standby host 106 is creating the checkpoint barrier, the amount of time the active VM 114a is suspended is greatly reduced. While or soon after the active VM 114a resumes operation, the VMRE 120 instructs the memory replication module 126a to send the dirty memory pages to the standby host 106. The memory replication module 126a then sends the dirty memory pages to the memory replication module 126b of the standby host 106, in step 520. It should be noted that step 520 occurs while the active VM 114a is operating.

In response to receiving the dirty memory pages, the VMRE 120b sends a commit signal to the disk control module 124b to commit the changes in the buffer 2 216 up to the checkpoint barrier marker 228. The disk control module 124b, in turn, controls the DRBD 128b to flush the changes in the buffer 2 216, up to the checkpoint barrier marker 228, into disk storage 112b, in step 522. The method 500 then flows through connector D 524 to step 526 in FIG. 5B. The memory replication module 126b stores the received dirty memory pages in main memory 110b, in step 526. Further, DRBD 128b continues to receive disk writes from DRBD 128a created by the operating active VM 114a. The received disk writes are buffered in buffer 2 216 after the checkpoint barrier marker 228, in step 528. Steps 524, 526, and/or 528 may occur substantially concurrent. Thus, the standby host 106 can complete the replication, while the active VM 114a continues to execute. Further, the memory image and the disk image at the standby host 106 are synced at the moment in time represented by the checkpoint barrier marker 228.

The method 500 may then flow to step 530. In this optional step, the infrastructure service module 116a may determine if the active VM 114a continues to execute, in step 530. Here, the infrastructure service module 116a is not checking for a fail over condition but an instance when the active VM 114a is purposefully terminated. If the active VM 114a continues to execute, the step 530 flows through connector C 432 back to step 502 in FIG. 5A. However, if the active VM 114a does not continue to execute, the step 530 flows to end operation 532.

Figure 6:
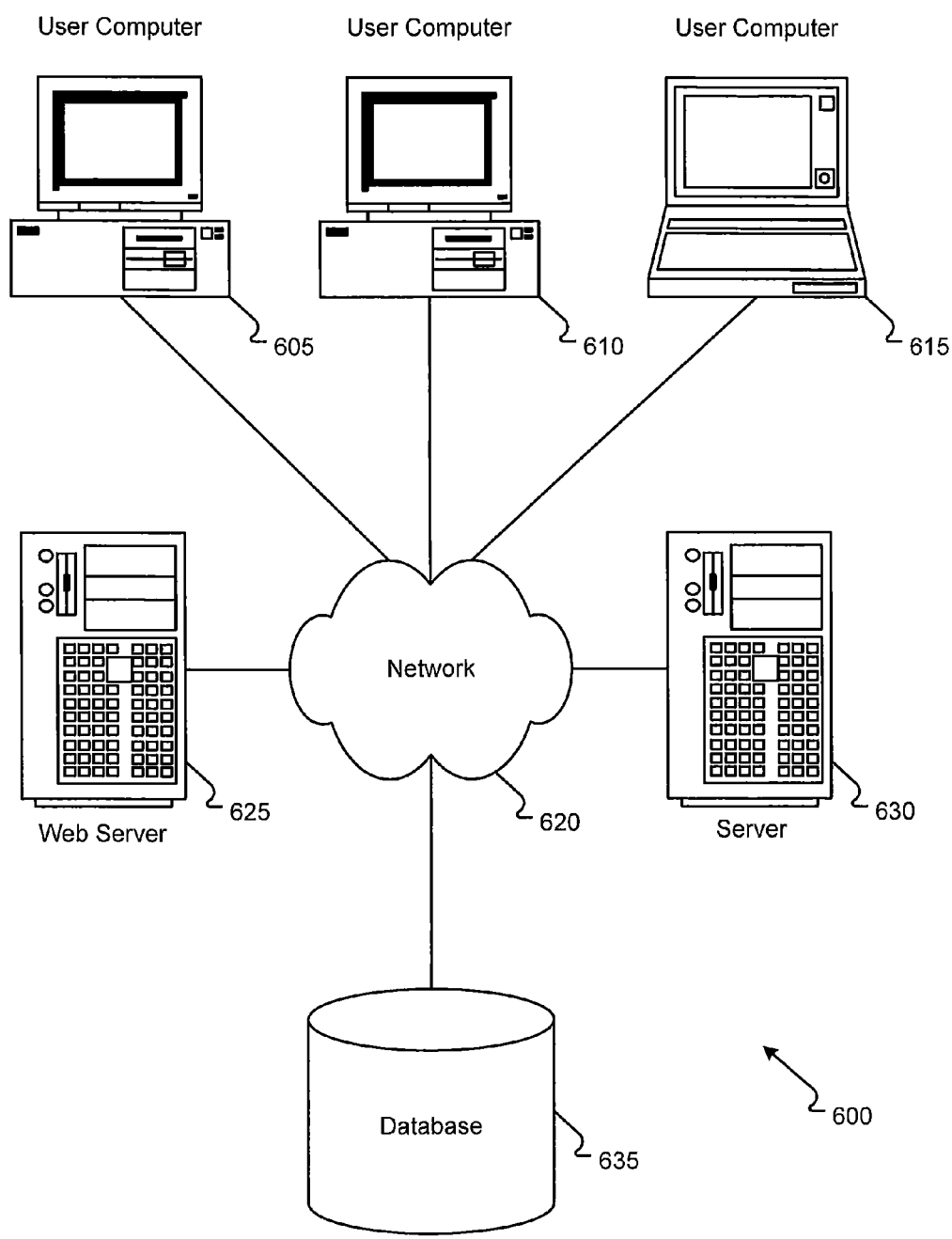
FIG. 6 is a block diagram of an embodiment of a computing environment operable to execute the HA protected VM.

FIG. 6 illustrates a block diagram of a computing environment 600 wherein the active host 102 and the standby host 106 may execute to provide HA for a VM executing on commodity hardware. As such, the system or components described in conjunction with FIG. 6 may be commodity hardware. The computing environment 600 includes one or more user computers 605, 610, and 615. The user computers 605, 610, and 615 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary computing environment 600 is shown with three user computers, any number of user computers may be supported.

Computing environment 600 further includes a network 620. The network 620 can be any type of network familiar to those skilled in the art that can support data communications using any of a variety of commercially-available protocols, including without limitation SIP, TCP/IP, SNA, IPX, AppleTalk, and the like. Merely by way of example, the network 620 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 620 may be the same or similar to network 104.

The system may also include one or more server computers 625, 630. One server may be a web server 625, which may be used to process requests for web pages or other electronic documents from user computers 605, 610, and 620. The web server can be running an operating system including any of those discussed above, as well as any commercially-available server operating systems. The web server 625 can also run a variety of server applications, including SIP servers, HTTP servers, FTP servers, CGI servers, database servers, Java servers, and the like. In some instances, the web server 625 may publish operations available operations as one or more web services.

The computing environment 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 6 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as the active host 102 and/or the standby host 106.

The computing environment 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands.

Figure 7:
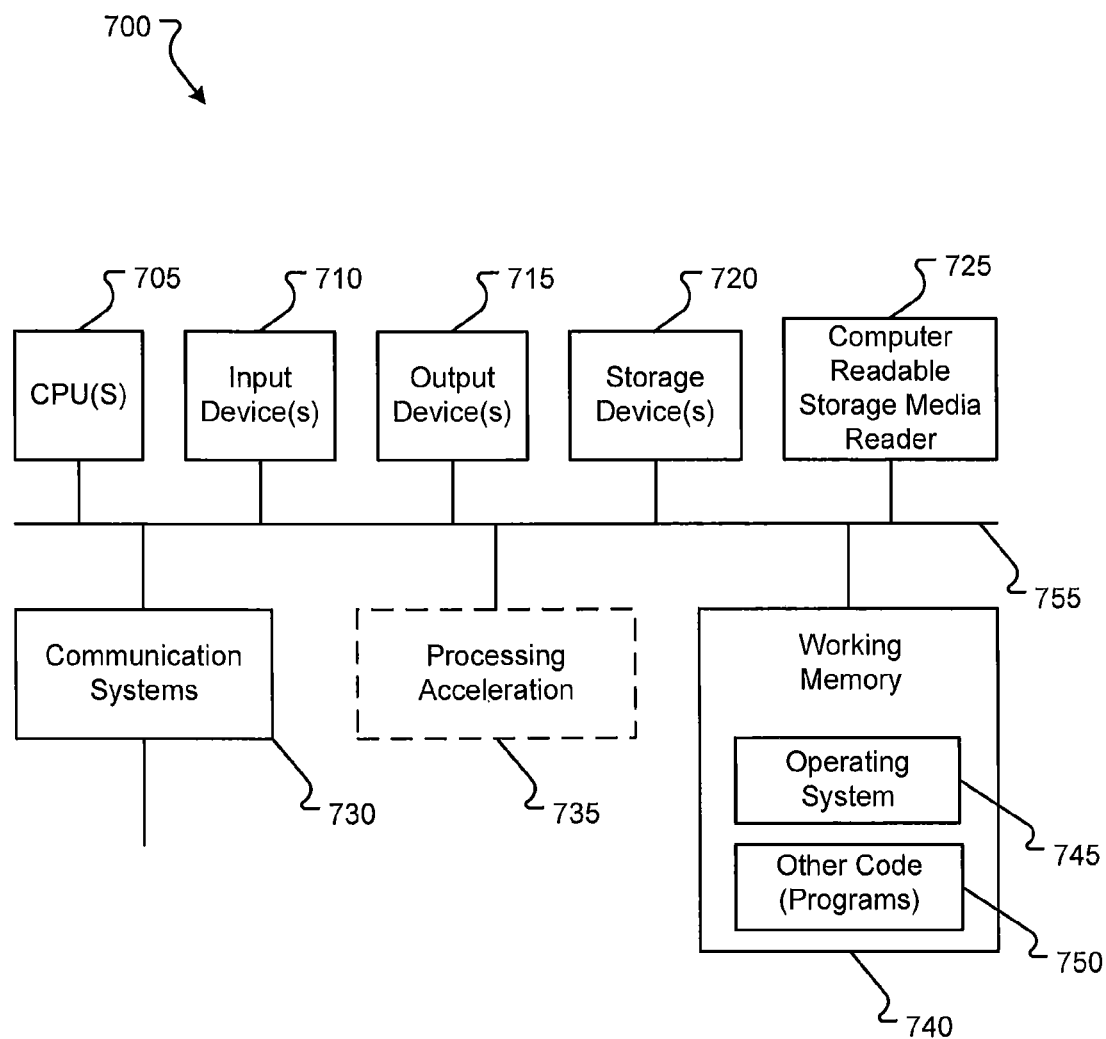
FIG. 7 is a block diagram of an embodiment of a computer operable to execute as a server that operates a VM.

FIG. 7 illustrates one embodiment of a computer system 700 upon which the active host 102, the standby host 106, or other systems or components described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor, and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 620 and/or any other computer described above with respect to the computer system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing high availability (HA) protection to a virtual machine (VM) executing on an active host, the method comprising:

a first processor of the active host initializing HA protection on a running VM at the active host, wherein the initialization of HA protection occurs without stopping an application executing on the active host and while maintaining a connection of the active host, wherein initializing comprises:

the first processor synchronizing a disk image of the VM between a disk storage at the active host and a standby host while the VM is running;

the first processor and a second processor of the standby host maintaining the synchronization of the disk image of the VM;

after initially synchronizing the disk image of the VM by copying the disk image of the VM from the disk storage at the active host to the standby host and while maintaining the synchronization of the disk image of the VM, the first processor synchronizing a memory image of the VM between the active host and the standby host, wherein, after memory synchronization, the memory image of the VM and disk image of the VM are synchronized;

once disk synchronization and memory synchronization are completed and the disk image and the memory image of the VM are synchronized, the second processor enabling a dynamic disk barrier process to be applied at a checkpoint time; and at a checkpoint interval time thereinafter, the first processor and the second processor synchronizing the disk image and the memory of the VM between the active host and the standby host for all changes, wherein the standby host controls a synchronization control process at the standby host that utilizes the dynamic disk barrier process to keep the memory and disk images of the VM synchronized at the checkpoint interval time for the VM on the active host and the standby host.

2. The method as defined in claim 1, wherein synchronizing the disk storage and the memory between the active host and the standby host for all changes, after the check point barrier, to the disk image and the memory image comprises:

copying at least a portion of a memory image associated with the VM to the standby host;

after completing the copy of the memory image, the first processor suspending execution of the VM;

the first processor sending the copy of the memory image from a buffer to the standby host;

in response to receiving the copy of the memory image, a second processor of the standby host activating disk buffering;

the second processor applying the copy of the memory image in a disk buffer up to a first checkpoint barrier marker;

the second processor sending a signal to the active host that the standby host is ready to apply HA protection;

the second processor creating a second checkpoint barrier; and in response to the signal, the first processor of the active host resuming operation of the VM.

3. The method as defined in claim 2, further comprising:
determining if a first disk image on the active host is synchronized with a second disk image on the standby host;

if the first disk image on the active host is synchronized with the second disk image on the standby host, the first processor initiating HA protection by copying the memory image; and if the first disk image on the active host is not synchronized with the second disk image on the standby host, the first processor and the second processor conducting an initial disk synchronization.

4. The method as defined in claim 3, wherein the disk synchronization is completed with a distributed replicated block device (DRBD) process.

5. The method as defined in claim 2, wherein copying at least portion of the memory image associated with the VM is completed with Xen live migration.

6. The method as defined in claim 2 further comprising:
after activating disk buffering, the first processor storing a disk write to the first disk storage;

the first processor synchronously sending the disk write to the standby host;

the second processor receiving the disk write from the active host; and the second processor storing the disk write to the disk buffer.

7. The method as defined in claim 6, wherein the disk write is received by the standby host while the second processor is applying the copy of the memory image.

8. The method as defined in claim 6, further comprising:
the first processor determining if a checkpoint has arrived;

if a checkpoint has arrived, the first processor suspending operation of the VM;

the first processor sending a checkpoint signal to the standby host;

the first processor copying the dirty memory pages to a local buffer;

the second processor marking a last disk write before the VM is suspended in the disk buffer as a checkpoint barrier;

the second processor sending a checkpoint okay message to the active host;

the first processor receiving the checkpoint okay message;

in response to receiving the checkpoint okay message and after copying the dirty memory pages, the first processor resuming operation of the VM;

the first processor sending the dirty memory pages to the standby host;

the second processor receiving the dirty memory pages;

in response to receiving the dirty memory pages, the second processor flushing a disk write in the disk buffer up to the checkpoint barrier; and the second processor applying the dirty memory pages to the memory image of the VM at the standby host.

9. The method as defined in claim 8, further comprising:
after marking the checkpoint barrier, the second processor receiving a second disk write from the active host; and the second processor storing the second disk write in the disk buffer after the checkpoint barrier, wherein the second disk write is not flushed.

10. A non-transient computer readable medium having stored thereon instructions that cause a computing system to execute a method for providing high availability (HA) protection to a running virtual machine (VA) executing on an active host, without the active host stopping the execution of an application, the instructions comprising:
instructions to initialize HA protection on the running VM at the active host;

instructions to determine if a checkpoint has arrived during an HA process;

if the checkpoint has arrived, instructions to suspend operation of the VM;

instructions to send a checkpoint signal to a standby host;

instructions to copy a dirty memory page to a buffer at the active host;

instructions to set a last disk write in a disk buffer at the standby host as a checkpoint barrier;

instructions to send a checkpoint okay message to the active host;

instructions to receive the checkpoint okay message from the standby host;

in response to receiving the checkpoint okay message and after copying the dirty memory page, instructions to resume operation of the VM;

instructions to send the dirty memory page to the standby host;

instructions to receive the dirty memory page;

in response to receiving the dirty memory page, instructions to flush two or more disk writes in the disk buffer up to the checkpoint barrier; and instructions to apply the dirty memory page.

11. The computer readable medium as defined in claim 10, further comprising:
after setting the checkpoint barrier, instructions to receive a second disk write; and instructions to store the second disk write in the disk buffer after the checkpoint barrier.

12. The computer readable medium as defined in claim 11, wherein the second disk write is not included in the flush of the disk buffer.

13. The computer readable medium as defined in claim 11, wherein the disk synchronization is completed with a distributed replicated block device (DRBD) process.

14. The computer readable medium as defined in claim 11, wherein copying the memory image associated with the VM is completed with Xen live migration.

15. The computer readable medium as defined in claim 10, further comprising:
instructions to synchronize a disk on the active host with a disk on the standby host;

instructions to receive the disk write from the active host; and instructions to store the disk write to a disk buffer.

16. A server computing system comprising:
an active host, the active host comprising a first processor and first memory, the first processor configured to:

initialize HA protection on a running VM first memory, wherein the initialization of HA protection occurs without stopping an application executing on the active host and while maintaining a connection of the active host, wherein initializing comprises:

synchronize a disk image of the VM between a disk storage at the active host and the standby host while the VM is running;

maintain the synchronization of the disk image of the VM with a standby host;

after initially synchronizing the disk image of the VM by copying the disk image of the VM from the disk storage at the active host to the standby host and while maintaining the synchronization of the disk image of the VM, synchronize a memory image of the VM between the active host and the standby host, wherein, after memory synchronization, the memory image and disk image of the VM are synchronized; and the standby host, the standby host comprising a second processor and a second memory, the second processor configured to:

once disk synchronization and memory synchronization are completed and the disk image and memory image of the VM are synchronized, enable a dynamic disk barrier process to be applied at a checkpoint time; and at a checkpoint interval time thereinafter, synchronize with the active host, the disk image and the memory of the VM between the active host and the standby host for all changes, wherein the standby host controls a synchronization control process at the standby host that utilizes the dynamic disk barrier process to keep the memory and disk images of the VM synchronized at the checkpoint interval time for the VM on the active host and the standby host.

\* \* \* \* \*